US00RE35897E

United States Patent [19]

Protz, Jr.

[11] E Patent Number: Re. 35,897

[45] Reissued Date of Patent: Sep. 15, 1998

[54] METHOD OF MAKING A RIBBON GARLAND

[75] Inventor: William F. Protz, Jr., Lake Forest, Ill.

[73] Assignee: Santa's Best, Northfield, Ill.

[21] Appl. No.: 395,052

[22] Filed: Feb. 27, 1995

Related U.S. Patent Documents

Reissue of:

[64] Patent No.: 5,201,699
Issued: Apr. 13, 1993
Appl. No.: 833,861
Filed: Feb. 11, 1992

U.S. Applications:

[63] Continuation of Ser. No. 651,664, Feb. 6, 1991, Pat. No. 5,091,226.

[51] Int. Cl.[6] ..... A41G 1/04

[52] U.S. Cl. ..... 493/346; 57/24; 428/10; 493/958

[58] Field of Search ..... 57/24, 203; 156/148; 362/122; 428/7, 10, 27; 493/346, 958

[56] References Cited

U.S. PATENT DOCUMENTS

| | | | |
|---|---|---|---|
| D. 250,101 | 10/1978 | Bartels et al. | 428/10 X |
| D. 263,290 | 3/1982 | Troyer | D11/119 |
| 1,659,584 | 2/1928 | Willis | 428/10 X |
| 1,694,125 | 12/1928 | Jopson | 428/10 |
| 1,773,580 | 8/1930 | Frank | 428/10 X |
| 1,904,471 | 4/1933 | Kelman | 428/7 X |
| 2,639,532 | 5/1953 | Seewald | 57/24 X |
| 2,880,540 | 4/1959 | Williams | 428/10 |
| 3,109,277 | 11/1963 | Raymond et al. | 57/24 |
| 3,130,412 | 4/1964 | Fox et al. | 493/958 X |
| 3,453,170 | 7/1969 | Jason | 428/26 |
| 3,484,329 | 12/1969 | Boisse | 428/10 X |
| 3,584,449 | 6/1971 | Pollard | 428/10 X |
| 3,607,508 | 9/1971 | Ha, Jr. | 156/159 |
| 3,637,452 | 1/1972 | Sanders | 428/10 |
| 3,780,514 | 12/1973 | Rodermund et al. | 428/10 X |
| 4,679,392 | 7/1987 | Nakagawa | 428/10 X |
| 4,789,571 | 12/1988 | Kinderman et al. | 428/10 |
| 4,963,411 | 10/1990 | Protz, Jr. | 428/123 |
| 4,964,932 | 10/1990 | Miller | 428/10 X |
| 5,091,226 | 2/1992 | Protz, Jr. | 428/10 |
| 5,201,699 | 4/1993 | Protz, Jr. | 428/10 X |

FOREIGN PATENT DOCUMENTS

| | | | |
|---|---|---|---|
| 777247 | 7/1957 | United Kingdom | 428/99 |
| 2089849 | 6/1982 | United Kingdom | 428/102 |

OTHER PUBLICATIONS

Exhibit B—Bradford Novelty Co. Inc. Catalog, 1974, p. 20.
Exhibit C—Photocopy of Exhibit 2 of Protest—Santa's Best Garland.
Exhibit D—Exhibits 1A, 1B, 1C, and 1D of Protest by Santa's Best Garland.
Exhibit E2—Youngcraft, 1993 Catalog, p. 11.
Exhibit E3—Rauch Industries, Inc., 1993 Catalog, p. 34, Item No. 6435.
Exhibit E4—Rauch Industries, Inc., 1992 Catalog, p. 32, Item No. 6436.
Exhibit E5—Rauch Industries, Inc., 1994 Catalog, p. 38.
Exhibit E6—Photocopy of F. C. Young Garland Samples & Drawings used in Protest.

(List continued on next page.)

*Primary Examiner*—Henry F. Epstein
*Attorney, Agent, or Firm*—Reinhart, Boerner, Van Deuren, Norris & Rieselbach, s.c.

[57] ABSTRACT

A decorative garland. A product and method of manufacture of garland includes a web having transversely cut center and border sections, and the center section has longer length transverse cuts and the border sections have shorter length transverse cuts. The cut film web is folded and then stuffed using a wire spine to hold a high density of cut film web. The stuffed web is then twisted causing formation of a helically rotated array of loops of the longer length transverse cut sections, and a tinsel-like material is positioned nearest the wire spine formed from the shorter length transverse cut sections of the web.

10 Claims, 3 Drawing Sheets

OTHER PUBLICATIONS

Exhibit E7—National Tinsel Mfg. Co., Price Lists, pp. 48–51.
Exhibit E8—Decor Noel, Christmas 1977 Catalog, p. 7.
Exhibit E9—Mystic Industries Corp., 1993 Catalog, p. 1, Item No. 230.
Exhibit F1—National Tinsel, Christmas 1989 Catalog, p. 51.
Exhibit F2—Porth Decorative Products 1986 Catalog, "Tree Decoration Pack".
Exhibit F3—Proth Decorative Products 1990 Catalog, p. 18.
Exhibit G1—Photograph from National Tinsel 1991 Catalog showing Fantasy Garland & Curly Velvet Garland.
Exhibit G2—Photograph from National Tinsel 1991 Catalog showing Fantasy Garland & Curly Velvet Garland.
Exhibit G3—Photograph from National Tinsel 1991 Catalog showing Fantasy Garland & Curly Velvet Garland.
Exhibit G4—Photograph from National Tinsel 1991 Catalog showing Fantasy Garland.
Exhibit G5—Photograph of F. C. Young Angel Spun Garland.
Exhibit G6—Photograph of F. C. Young Angel Spun Garland.
Exhibit G7—Photograph of F. C. Young Angel Spun Garland.
Exhibit G8—Holiday Trims, Inc. 1992 Catalog, pp. 24–33.
Exhibit G9—National Tinsel, Christmas 1990 Price List, pp. 3–11.
Exhibit G10—National Tinsel, Christmas 1991 Catalog, pp. 6 and 11.
Exhibit H1—Santa's Best Home Decor 1993 Price List, pp. 4–16.
Exhibit H2—National Tinsel and National Decorations Christmas 1990 Catalog, pp. 90–91.
Exhibit H3—Santa's Best Tinsel 1992 Price List, pp. 3–15.
Exhibit H4—National Tinsel/Ntaional Decorations/Lights Up 1991 Price List, pp. 3–16.
Exhibit H5—Santa's Best Tinsel 1992 Catalog, pp. 1,2,7, and 8.
Exhibit H6—Youngcraft 1992 Catalog, p. 6.
Exhibit H7—Youngcraft 1992 Price List, pp. 3–10.
Exhibit I—Porth Products Catalog (formerly Porth Textiles and Swan), Swan Christmas Decorations and Gift Dressings 1975–76, showing Tinsel Garland (double bubble garland with or without fringe).
Exhibit J1—Sample of Large Curly Velvet Garland.
Exhibit J2—Sample of Regular Curly Velvet Garland.
Exhibit J3—Sample of Garland with loop length about 1", loop width about ¼", and about ¼" fringe radiating from center.
Exhibit J4—Sample of Regular Tiffany Garland.
Exhibit J5—Sample of Garland with loop less than 1", loops less than ¼" with fringe almost as long as loop.
Exhibit J6—Sample of Garland with loop length about 1" and loop width less than ¼" with fringe as long as loop.
Exhibit J7—Sample of Angel Spun Garland.
Exhibit J8—Sample of Angel Hair Garland.
Exhibit J9—Sample of Garland with loop width less than ¼", loop length less than or about 1" with no fringe radiating from center.
Exhibit J10—Sample of Garland with loop width less than ¼", loop lenth less than or about 1" with additional shorter inner loop.
Exhibit J11—Sample of Garland with loop width less than ¼", loop length greater than 1" and less than ¼" fringe radiating from center.
Exhibit J12—Sample of Fantasy Garland.
Exhibit J13—Sample of Garland with 2 loop widths, loop length about 1", and less than ¼" fringe radiating from center.
Exhibit J14—Garland with loop width less than ¼", loop length about 1" and less than ¼" fringe radiating from center.
Exhibit J15—Garland with 2 loops, has twisted appearance, loop widths less than ¼", loop lenghts about 1", and fringe almost as long as loop.
Exhibit J16—Sample of Garland with loop width less than ¼", loop length about 1", and fringe radiating from center—some less than ¼" in length and in width and some as long as loop and half as wide as loop.
Exhibit J17—Sample of Garland with loop length about 1" and loop width less than ¼" with fringe radiating from center—some shorter than and some longer than loop.
Exhibit J18—Sample of Garland with loops about 1" and less than ¼" in width, with fringe longer than loops, and loops have a twisted appearance.
1993 Youngcraft catalog, pp. 3, 6, 11, 12, and 13.
1992 Brite Star catalog, pp. 3 and 8.
1992 Brite Star price catalog, pp. 1 through 48.
1991 Brite Star catalog, p. 12.
1991 Charisma catalog, p. 5.
Ribbon Garland Sample: "Reflections" by F. C. Young & Co., Circa Pre 1989.
Ribbon Garland Sample: "Small Tree Trim" by F. C. Young & Co. Circa Pre 1989.
Ribbon Garland Sample: "Double Folded Trim". Conventional Use Pre 1985.

METHOD OF MAKING A RIBBON GARLAND

Matter enclosed in heavy brackets [ ] appears in the original patent but forms no part of this reissue specification; matter printed in italics indicates the additions made by reissue.

This is a continuation of co-pending application Ser. No. 07/651,664, now U.S. Pat. No. 5,091,226 filed on Feb. 6, 1991.

The present invention is directed generally to a decorative garland. More particularly, the invention is directed to a decorative garland constructed from a cut film web having a center web portion with widely spaced transversely cut sections forming loops upon longitudinal folding of the web. The web further includes a border web portion with narrowly spaced transversely cut sections forming a fine cut, tinsel-like appearance near the wire spine holding the film web.

Previous decorative garland typically has a uniform, finely cut tinsel appearance or consists of a longitudinal string of bows or loops. Garland thus has not been constructed from a web of cut film to produce a product of varying decorative appearance. In addition, it has been extremely difficult to produce decorative garland using wider film web sections for the loop type of elements or wide cut tinsel elements. The supporting wire spin can crush and distort wider strips of loops or tinsel elements, creating an unattractive appearance for the garland, and it is also difficult to stuff any substantial amount of film web into the wire spine having wide strips for the loops or tinsel elements.

It is therefore an object of the invention to provide an improved decorative garland and method of manufacture.

It is another object of the invention to provide a novel decorative garland having at least two different film web texture features.

It is a further object of the invention to provide an improved decorative garland constructed from a cut film web having widely spaced transverse cuts in a center web portion and narrowly spaced transverse cuts in a border web portion.

It is an additional object of the invention to provide a novel decorative garland constructed from a film web folded longitudinally along a line through a center web portion.

It is yet another object of the invention to provide an improved decorative garland having a wire spine twisted along a folded border web portion of a cut film web and forming a spiraled plurality of wide cut loops extending from the wire spine and a plurality of narrow cut tinsel-like elements nearest the wire spine.

It is still a further object of the invention to provide a novel cut film web having a center web portion and border web portion with different widths of transversely cut sections for forming decorative garland.

It is yet an additional object of the invention to provide an improved decorative garland having a mixture of a variable width cut film web held by a spirally wound wire spine.

It is still another object of the invention to provide a novel decorative garland comprised of a spirally wound wire spine holding a narrowly cut border web portion, allowing the wider cut center web portion to form undistorted loops extending from the wire spine.

It is yet a further object of the invention to provide an improved garland having a high density of web loops and/or tinsel-like elements by virtue of wrapping the wire around a crushable, narrowly cut border web portion.

Other objects, features and advantages of the present invention will be readily apparent from the following description of the preferred embodiments thereof, taken in conjunction with the accompanying drawings described below wherein like elements have like numerals throughout the several views.

DETAILED DESCRIPTION OF A PREFERRED EMBODIMENT

Figure 1:
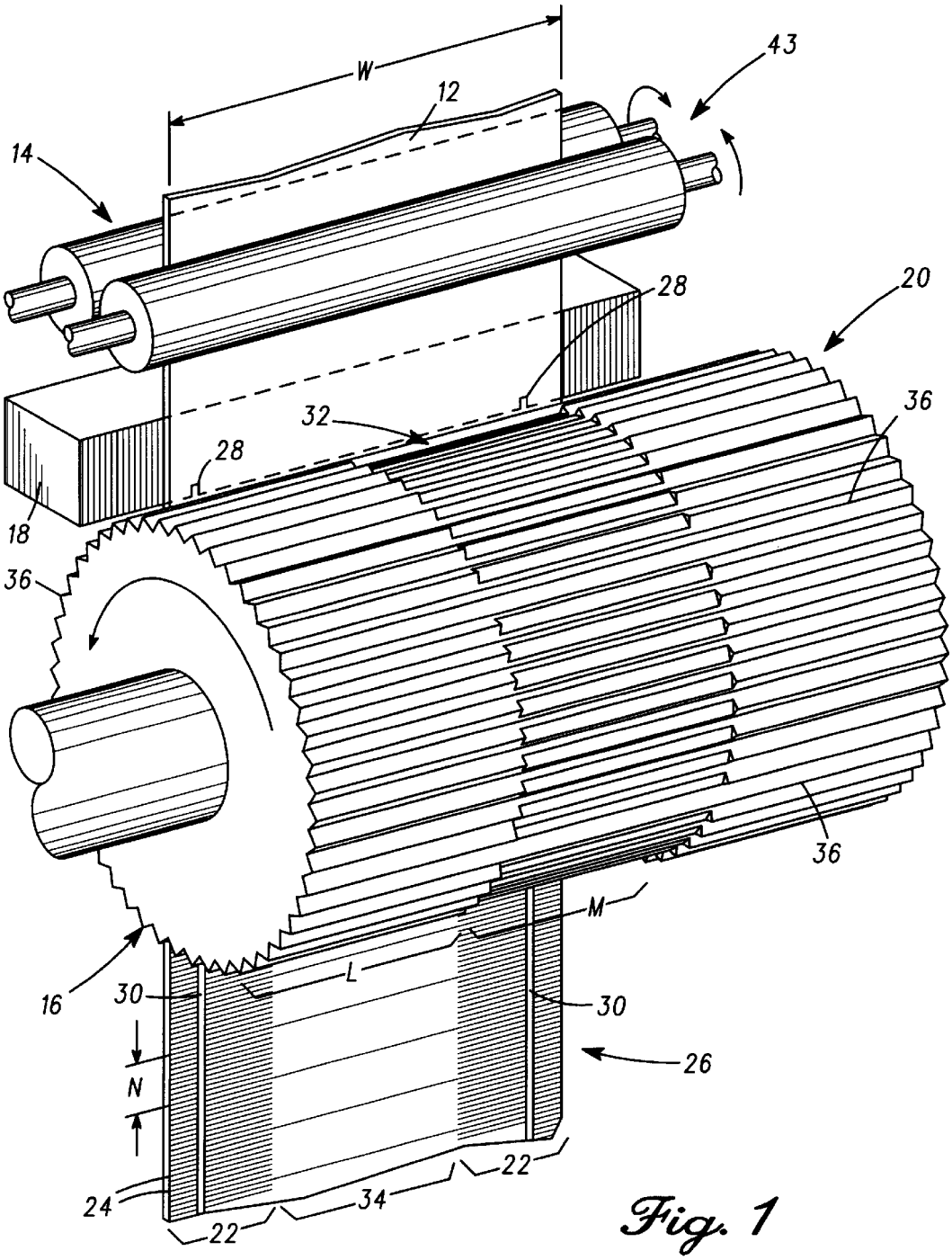
FIG. 1 illustrates the feeding of raw web material to a cutting device for forming a cut film web.
Figure 2:
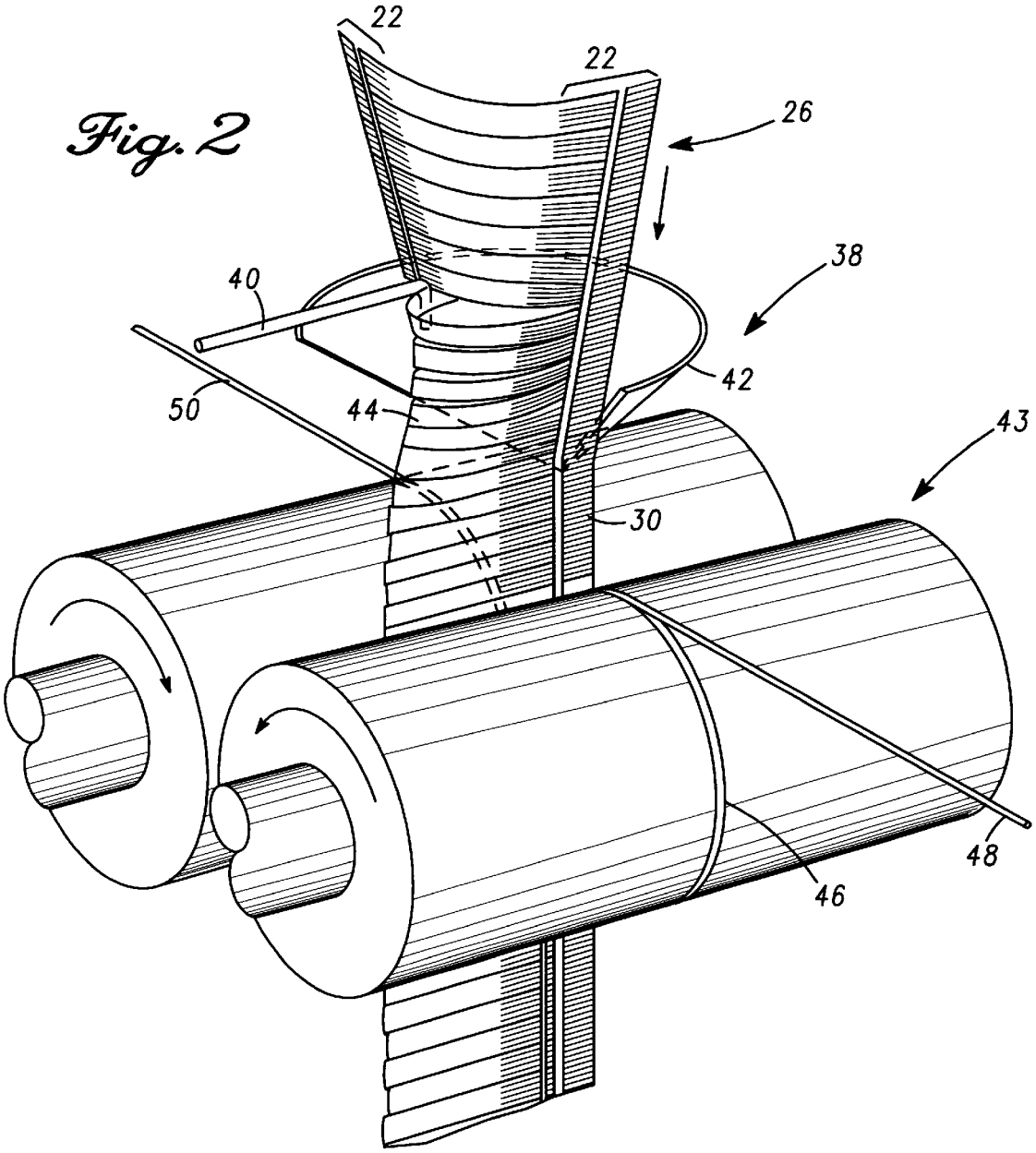
FIG. 2 shows the folding of the cut film web and the use of wires to receive and hold the cut film web along a longitudinal line within the narrowly spaced cut, border web portion.
Figure 3C:
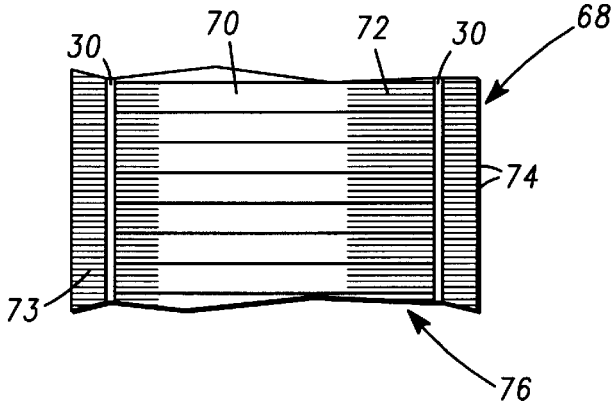
FIG. 3C shows a web with asymmetrical cut widths for the center and border web portions.
Figure 3A:
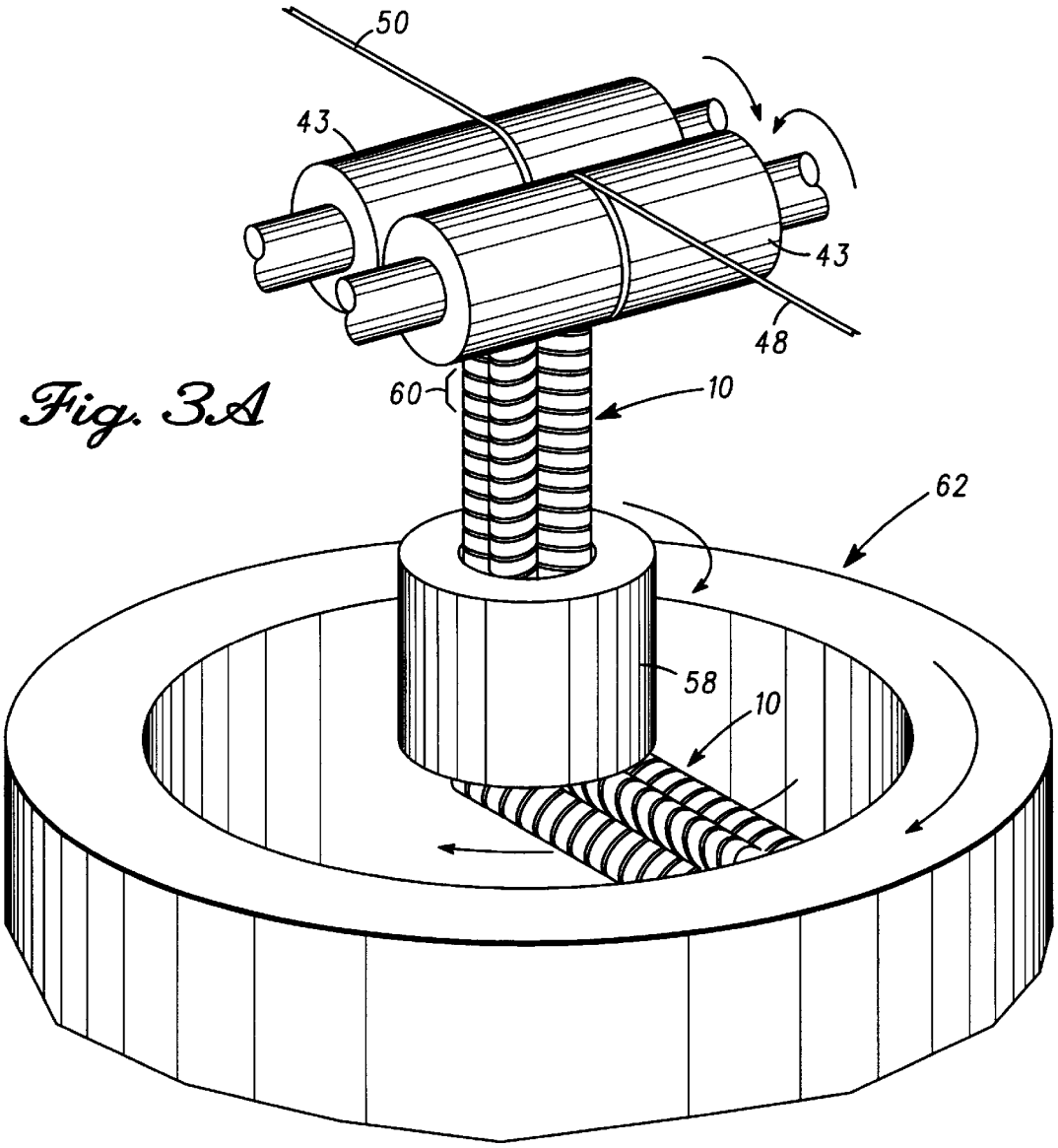
FIG. 3A illustrates the spinning and twisting of the garland product to obtain the desired wire spine twist.
Figure 3B:
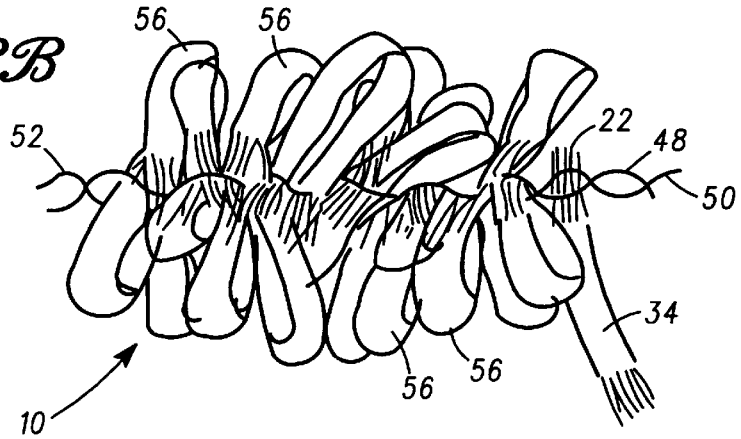
FIG. 3B shows a close view of the garland and wire spine region used for stuffing the cut film web and achieving the spiral arrangement of loops formed.

A decorative garland constructed in accordance with the invention is shown generally at 10 in FIG. 3B. The structure of the decorative garland (hereinafter "garland 10"), can best be understood by reference to FIGS. 1–3 showing various stages of manufacture. A source web (not shown) of material, such as conventional plastic, nylon, cloth fabric and the like, are precut to a desired width "W" for a starting web 12 shown in FIG. 1. This starting web 12 is drawn by feed rollers 14 for selective cutting by a cutting means, such as a rotary cutter 16 and an associated cutting bar 18. In order to generate the desired cutting pattern, the rotary cutter 16 has spaced cutting edges 20 extending the desired length "L" to form a border web portion 22 having narrowly spaced cuts 24, transversely disposed along cut film web 26. Note the cutting bar 18 interacts with the rotary cutter 16 to complete the cutting process, and includes at least one notch 28 to leave a continuous uncut web strip 30. The uncut web strip 30 is needed to maintain the necessary rigidity and support to enable processing of the cut film web 26.

A recessed section 32 of length "M" in the rotary cutter 16 allows formation of a center web portion 34 having a widely spaced transverse cut (e.g., of width "N" in FIG. 1). That is, the cutting edges 20 are recessed along M to prevent cutting the web 12. Therefore, the wider web portions 34 are formed by using selected cutting teeth, such as tooth 36, to cut across the full width of the web 12, except for the region of the uncut web 30.

The resulting cut film web 26 is then fed to a folding and stuffing station 38 shown in FIG. 2. The cut film web 26 is folded longitudinally along a line through the center web portion 34 using folding means. An example of such a folding means is shown in FIG. 2 wherein a curved rod 40 flips the edge of the cut film web 26. The web 26 can then engage a "V" shaped guide device 42 which gathers or completes the fold of both of the border web portions 22 in a back to back manner.

Draw rolls 43 pull the folded web 44 at the same linear speed of travel as the feed rolls 14. These draw rolls 43 include means for holding the folded web 44, including wire grooves 46 for guiding a front wire 48 and a rear wire 50 into engagement with the folded web 44. The wires 48 and 50 are preferably metered out at a rate of travel of approximately one-sixth the rate of linear travel of the folded web 44. These two wires 48 and 50 are then twisted about the narrow cut border web portions 22 to form a wire spine 52 (see FIG. 3B) enabling the support and compaction, or stuffing, of the folded web 44 by the wire spine 52 without crushing or crinkling of the wider center web portion 34. In addition, this speed differential between the wires and web enables forming a garland 10 having a high density of loops 56 and of narrowly cut border web portions 22 along the length of the wire spine 52. In fact, due to the crushable nature of the narrowly cut portions 22, the wire spine 52 can retain a substantial amount of web material compared to trying to compact wider cut web material. This high density stuffing further results in the narrowly cut, or closely spaced cut, tinsel-like border web portions 22 appearing as a distinctive tinsel-like decorative element. These tinsel-like elements are radially disposed near the wire spine 52, and the bow-like loops 56 are disposed further from the wire spine 52 (see FIG. 3B).

The twisting process is best illustrated in FIG. 3A wherein the draw rolls 43 engage the folded web 44 with the wires 48 and 50 in the manner described hereinbefore. A rotating bushing assembly 58 centers and aids in twisting unfinished web 26, resulting in forming the finished garland 10 just below the draw rolls 43 in region 60. The assembly 58 also directs the garland 10 to a rotating drum 62. In the drum 62 a centrifugal force is generated and is transmitted upward to the region 60 of the web 26, causing the twisting of the wires 48 and 50 to form the helically wound wire spine 52. The resulting finished garland 10 is also collected in the rotating drum 62. The rate of linear travel for the folded web 44, the infeed rate of the wires 48 and 50 and the rotational rate of the rotating drum 62 can be used, alone, or together, to control the pitch of the wire spine winding and the density of the folded web 44 along the wire spine 52.

In other embodiments more than two wires can also be used and more than one type or number of the starting webs 12 (different color, different transverse cut spacing or even longitudinal cuts) could be used to take advantage of the features of the invention.

In another form of the invention shown in FIG. 3C, a cut film web 68 can include widely spaced transverse cut sections 70 and a transversely adjacent web portions 72 and 73 having narrowly spaced transverse cut sections 74. This asymmetric cut pattern with varying widths of transverse cut spacings will enable forming a garland having a different appearance than shown in FIG. 3B.

The cut film web 68 shown in FIG. 3C can be processed in a similar manner as shown in FIGS. 1–3A to produce however a somewhat appearing garland. The appearance of the resulting garland would depend upon the selected location where the wires 48 and 50 were engaged with the cut film web 68. For example, if the wires 48 and 50 were engaged along line 76 shown in FIG. 3C, the resulting garland would generally still include loop shapes, such as the loops 56 in FIG. 3B. However, the tinsel-like features of narrowly cut sections 74 will appear not only very near the wire spine 52 (as in FIG. 3B), but will also appear radially further out from the wire spine 52 near the radial extension of the loops 56. Other such decorative features can be generated by selecting different widths for the starting web 12 over which wide and narrow transverse cutting is carried out.

While preferred embodiments of the invention have been shown and described, it will be clear to those skilled in the art that various changes and modifications can be made without departing from the invention in its broader aspects as set forth in the claims provided hereinafter.

I claim:

1. A method of making a decorative garland, comprising the steps of:

providing a starting web of film material;

cutting said starting web film material between longitudinal edges, said cutting being selectively performed by cutting means to generate a cut pattern with said starting web film material having an uncut longitudinal web strip near each said longitudinal edge to maintain support of said cut pattern of said starting web film material and said cut pattern comprised of a shorter transverse length of cut web film material on one side of each said uncut web strip and a longer transverse length of cut web film material on the other side of said uncut web strip;

folding said web film material only once along a longitudinal axis of said cut web film material and along a single fold line about in the middle of said web film material to form a plurality of loops from said cut web film material; and applying a wirelike spine to said folded cut web film material to form a plurality of loops extending radially outward from said wirelike spine, said wirelike spine further twisted about said cut web film material such that said shorter transverse length of cut web film material is disposed radially closer said wirelike spine than the ends of said loops.

2. The method as defined in claim 1 wherein said wirelike spine is applied to said folded cut form of said starting web film material with said shorter transverse length of said cut web film material being compacted or stuffed along the length of said wirelike spine thereby retaining a high density of said cut web film material along said wirelike spine.

3. The method as defined in claim 1 wherein said cut form of said starting web film material includes substantially equal width cuts longitudinally for said shorter and longer transverse lengths of said starting web film material.

4. The method as defined in claim 1 wherein said step of longitudinal folding results in a plurality of transverse cut strips of said starting web film material being folded against each other to form a plurality of said loops disposed in a helical pattern about said spine.

5. The method as defined in claim 1 wherein said cut form of starting web film material includes different longitudinal width transverse cuts of said starting web film material.

6. A method of making a decorative garland, comprising the steps of:

providing a starting web film material;

cutting transversely said starting web film material between longitudinal sides of said starting web film material and with at least a portion of the cut part of said starting web film material stopping short of each of the longitudinal sides of said starting web film material and further forming shorter transverse length cuts of border web film material portions adjacent the longitudinal sides of said web film material;

folding said cut starting web film material longitudinally along a line between the longitudinal sides of said cut web film material such that a plurality of loops are formed and said shorter transverse length cuts of border web material are disposed face on each other after folding; and wrapping said folded web film material using a wirelike spine to hold said folded cut web film material by twisting said wirelike spine about said folded cut web film material such that loops are formed on one side of said wirelike spine and the shorter transverse length cuts of border web material which are extensions of each said loop form open ended portions of said cut web film material radially closer to said wire spine compared to the radial end of each said loop, said twisted wirelike spine causing formation of a helically twisted array of loops along the length of said spine and further compacting said cut web film material along the length of said wirelike spine to retain a high density of said cut web film material along said wirelike spine.

7. A method of forming a decorative garland having a plurality of loops, comprising the steps of:

providing a starting web film material;

cutting said web film material between longitudinal sides of said web film material with substantially equal longitudinal width cuts and said web film material including a longer transverse length cut portion and with a shorter transverse length cut portion being positioned adjacent the longitudinal borders of said web film material, said longer and shorter transverse length cut portions separated by an uncut longitudinal web strip for providing support for said web film material;

folding said web between the longitudinal sides of said cut web film material;

wrapping said folded web film material along a longitudinal axis of said web film material using a wirelike spine to hold said folded cut web by twisting said spine about said folded cut web film material causing formation of said loops in a helically twisted array along the length of said spine and each of said shorter transverse length cut portions being disposed radially nearest said wire spine relative to said loops; and compacting said shorter transverse length cut portion along said wirelike spine thereby retaining a high density of said cut web film material along said wirelike spine.

8. The method as defined in claim 7 wherein at least one of a rate of linear travel for said folded cut web film material and an infeed rate of said wirelike spine can be varied to control the level of said high density of said cut web film material along said wirelike spine.

*9. A method of making a decorative garland comprising the steps of:*

*providing an elongate web of film material having longitudinal edges;*

*cutting said web between said longitudinal edges to form an uncut strip adjacent each of said longitudinal edges and to form a plurality of cut sections extending between said uncut strips;*

*folding said cut web so as to bring said uncut strips substantially parallel to and adjacent each other thereby forming said cut sections into loops extending between said uncut strips;*

*stuffing said folded cut web in a direction along its length to increase the density of said loops;*

*applying a wire-like spine to said stuffed folded cut web adjacent said uncut strips; and*

*twisting said wire-like spine to capture and retain said stuffed folded cut web and to arrange said loops radially around said wire-like spine.*

*10. A method as defined in claim 9 further including the step of cutting said web to form a plurality of cut sections extending outwardly from said uncut strips to said longitudinal edges.*

* * * * *